(12) United States Patent
Berkhahn et al.

(10) Patent No.: US 12,497,172 B2
(45) Date of Patent: Dec. 16, 2025

(54) CABIN MONUMENT AND AIRCRAFT

(71) Applicant: Airbus Operations GmbH, Hamburg (DE)

(72) Inventors: Sven-Olaf Berkhahn, Hamburg (DE); Sarico Schultz, Hamburg (DE); Michael Lüdtke, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 179 days.

(21) Appl. No.: 18/457,103

(22) Filed: Aug. 28, 2023

(65) Prior Publication Data

US 2024/0067342 A1 Feb. 29, 2024

(30) Foreign Application Priority Data

Aug. 30, 2022 (EP) ..................................... 22192739

(51) Int. Cl.
 *B64D 11/00* (2006.01)
(52) U.S. Cl.
 CPC ...... *B64D 11/0015* (2013.01); *B64D 11/0023* (2013.01); *B64D 2011/0038* (2013.01)
(58) Field of Classification Search
 CPC ............... B64D 11/00; B64D 11/0015; B64D 11/00151; B64D 11/0023; B64D 2011/0038
 See application file for complete search history.

(56) References Cited

U.S. PATENT DOCUMENTS

| | | | | |
|---|---|---|---|---|
| 9,791,694 B1* | 10/2017 | Haverkamp | ............ | G06F 3/011 |
| 11,182,970 B1* | 11/2021 | Kathol | .................. | B64D 43/00 |
| 2006/0228558 A1* | 10/2006 | Berry | .................... | B32B 27/286 |
| | | | | 428/412 |
| 2009/0224103 A1* | 9/2009 | Neumann | .......... | B64D 11/0023 |
| | | | | 244/129.1 |
| 2010/0014009 A1* | 1/2010 | Stavaeus | ............ | B64D 11/0015 |
| | | | | 348/837 |
| 2012/0098455 A1* | 4/2012 | Marwede | ................. | B60Q 3/43 |
| | | | | 315/250 |
| 2013/0016525 A1* | 1/2013 | Metzech | ................. | G09F 13/18 |
| | | | | 362/602 |
| 2014/0158826 A1* | 6/2014 | Young | .................... | B64D 11/04 |
| | | | | 244/118.5 |
| 2014/0175219 A1* | 6/2014 | Young | .................... | B64D 11/04 |
| | | | | 244/118.5 |
| 2014/0313751 A1* | 10/2014 | Abel | ........................ | B60Q 3/47 |
| | | | | 362/464 |

(Continued)

FOREIGN PATENT DOCUMENTS

| | | |
|---|---|---|
| EP | 3378785 A1 | 9/2018 |
| EP | 3546356 A1 | 10/2019 |
| EP | 3552964 A1 | 10/2019 |

OTHER PUBLICATIONS

European Search Report for corresponding European Patent Application No. 22192739 dated Jan. 30, 2023; priority document.

*Primary Examiner* — Alexander K Garlen

(74) *Attorney, Agent, or Firm* — Greer, Burns & Crain, Ltd.

(57) ABSTRACT

A cabin monument having a monument body and a transparent film which is connected to the monument body. The transparent film has a large number of light-emitting elements. Further provided is an aircraft having at least one such cabin monument and a control device.

10 Claims, 3 Drawing Sheets

(56) References Cited

U.S. PATENT DOCUMENTS

| | | | |
|---|---|---|---|
| 2015/0077337 A1* | 3/2015 | Coto-Lopez | G06F 3/017 |
| | | | 345/156 |
| 2015/0274068 A1 | 10/2015 | Falconi et al. | |
| 2018/0273178 A1 | 9/2018 | Ibrahim et al. | |
| 2019/0300174 A1* | 10/2019 | Young | G09G 5/10 |
| 2019/0352009 A1 | 11/2019 | Young et al. | |
| 2019/0382131 A1* | 12/2019 | Johannessen | G09F 13/22 |
| 2020/0002024 A1* | 1/2020 | Johannessen | B64D 45/00 |
| 2020/0130839 A1* | 4/2020 | Hahn | G06F 3/0443 |
| 2022/0055751 A1 | 2/2022 | Hansson et al. | |
| 2022/0231264 A1* | 7/2022 | Morales Anton | H10K 59/18 |

* cited by examiner

CABIN MONUMENT AND AIRCRAFT

CROSS-REFERENCES TO RELATED APPLICATIONS

This application claims the benefit of the European patent application No. 22192739.5 filed on Aug. 30, 2022, the entire disclosures of which are incorporated herein by way of reference.

FIELD OF THE INVENTION

The present invention relates to a cabin monument and an aircraft.

BACKGROUND OF THE INVENTION

In modern aircraft, particularly aircraft for transporting passengers over long distances, a large number of screens which are fitted to different cabin monuments are used. In this instance, any component which is arranged inside the cabin of an aircraft is understood to be a cabin monument. In this case, they may be cabin partition walls, seat subassemblies or storage areas for hand luggage. These screens are used both for displaying important information items, for example, information items which are relevant to safety, and, for example, for playing back entertainment media.

Each screen which is provided in this manner contributes to the total weight of the aircraft which is intended to be kept as low as possible for many reasons, for example, with respect to fuel consumption. Screens also contribute in the active state to the energy consumption of the aircraft which is also intended to be kept as low as possible, wherein an inactive screen appears black to the viewer and contrasts with the cabin monuments which are usually configured in a light color, which can be perceived by passengers as unattractive.

SUMMARY OF THE INVENTION

Against this background, an object of the present invention is to reduce the weight and energy requirement of screens in an aircraft and at the same time to avoid visual effects which are perceived to be unattractive.

Accordingly, a cabin monument is provided. Such a cabin monument may be, for example, an aircraft kitchen or galley, an aircraft toilet or lavatory, a storage facility or stowage or a partition wall. The cabin monument comprises a monument body and a transparent film which is connected to the monument body. The transparent film has a large number of light-emitting elements.

An aircraft is further provided. The aircraft comprises at least one cabin monument according to the invention and a control device which is constructed to control the large number of light-emitting elements of the at least one cabin monument.

The notion forming the basis of the present invention is to use light-emitting elements which are embedded in a transparent film as "pixels" of a screen for a cabin monument. Accordingly, weight can be saved in comparison with conventional screens because the transparent film is constructed to be very thin and therefore also light while, in the event of inactivity of the light-emitting elements, the visual overall impression of the cabin monument remains unchanged as a result of the transparency of the film.

According to a further development of the cabin monument, the light-emitting elements may be in the form of light-emitting diodes. It is thereby possible to configure the light-emitting elements to be particularly small, light and energy-efficient.

According to another exemplary embodiment of the cabin monument, the transparent film can be applied to a surface of the monument body. This allows a particularly simple production or even retrofitting of already-existing cabin monuments.

According to a further development, the cabin monument can further have a transparent protective coating. The transparent film can thereby advantageously be protected from damage.

According to a further development of the cabin monument, the monument body can have a continuously transparent region, wherein the transparent film at least partially overlaps the transparent region. It may thereby become possible to see through the cabin monument in specific situations, for example, in the form of a cabin partition wall, and not in other situations.

According to a further development of the cabin monument, the light-emitting elements can be arranged in such a manner that light is emitted through the transparent region. The film can thereby be applied at locations where as little interaction with the environment as possible, for example, with passengers, has to be anticipated, which can protect the film from damage.

According to another exemplary embodiment of the cabin monument, the cabin monument can be in the form of a seat component or cabin partition wall. In these types of cabin monument, the screens may perform various advantageous functions, as will be explained in greater detail below.

According to another exemplary embodiment of the aircraft, the control device can be constructed to control the light-emitting elements of the at least one cabin monument in accordance with an operating state of the aircraft. The energy consumption of the light-emitting elements can thereby be precisely controlled in an advantageous manner.

According to a further development of the aircraft, the operating state of the aircraft can include a take-off operation or a landing operation during which the light-emitting elements are controlled in such a manner that light is emitted. The advantages of this configuration will be explained below in detail with reference to the FIGURES.

According to another exemplary embodiment of the aircraft, the aircraft may have at least two cabin monuments, wherein the control device is constructed to control the light-emitting elements of the at least two cabin monuments in accordance with each other. A particularly advantageous, harmonious, visual overall impression of the cabin of the aircraft can thereby be achieved.

The above embodiments and further developments can be freely combined with each other, if advantageous. Other possible embodiments, further developments and implementations of the invention also include non-explicitly mentioned combinations of features of the invention which have been described above or will be described below with reference to the exemplary embodiments. In this case, the person skilled in the art will particularly also add individual aspects as improvements or additions to the respective basic form of the present invention.

BRIEF DESCRIPTION OF THE DRAWINGS

The Present Invention is Explained in Greater Detail Below with Reference to the Exemplary Embodiments which are Set Out in the Schematic FIGURES. In the Drawings.

DETAILED DESCRIPTION OF THE PREFERRED EMBODIMENTS

Figure 1:
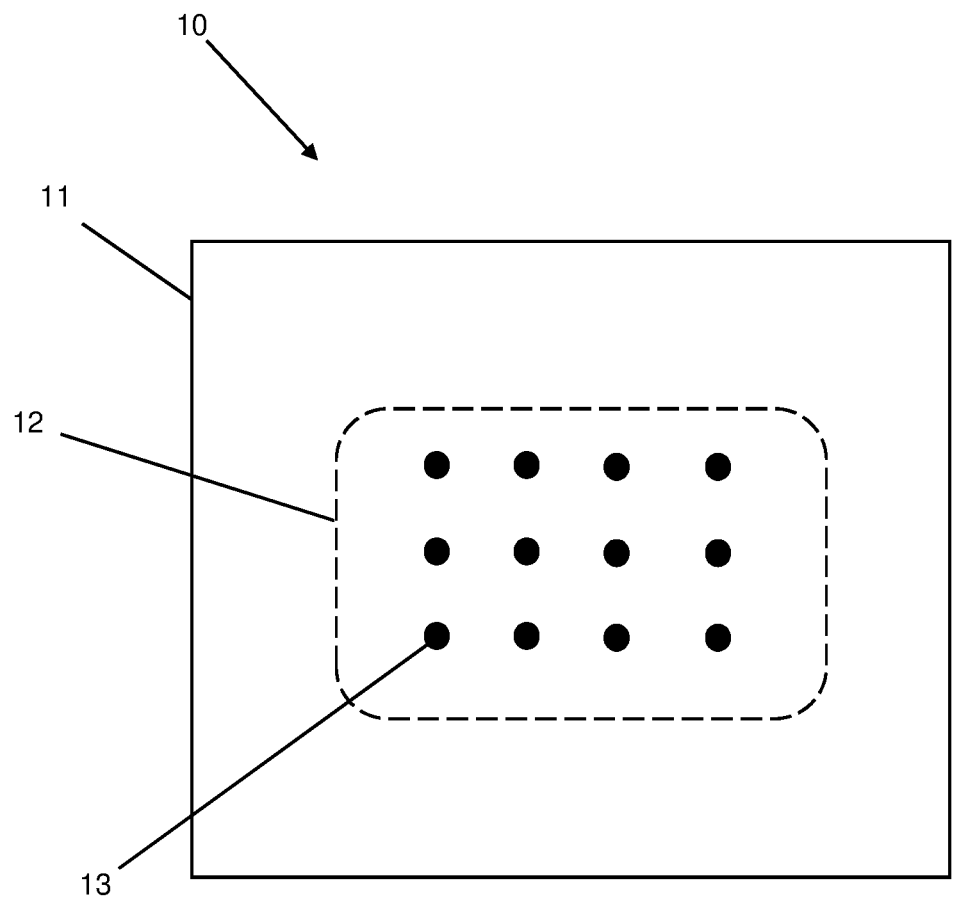
FIG. 1 shows a schematic illustration of a cabin monument according to one exemplary embodiment of the present invention.

The appended FIGURES are intended to convey an additional understanding of the embodiments of the invention. They depict embodiments and are used in connection with the description to explain principles and concepts of the invention. Other embodiments and many of the advantages mentioned result with regard to the drawings. The elements of the drawings are not necessarily shown in a manner true to scale relative to each other.

In the FIGURES of the drawings, identical, functionally identical and identically functioning elements, features and components—unless otherwise set out—are referred to using the same reference numerals.

FIG. 1 shows a schematic illustration of a cabin monument 10 according to a preferred exemplary embodiment of the present invention.

The cabin monument 10 has a monument body 11 and a transparent film 12 which is connected to this monument body 11. The transparent film 12 has a large number of light-emitting elements 13, such as more than 10, or more than 100, or more than 1000.

The monument body 11 shown in FIG. 1 is represented by way of example by a rectangle. In a real embodiment of the cabin monument 10, however, the monument body 11 can take up any conceivable form, in accordance with the function which the cabin monument 10 is intended to perform. In particular, the monument body 11 can also be assembled from a large number of separate individual pieces.

The transparency of the film 12 is indicated in FIG. 1 by the use of a dashed outline. In the context of the present invention, the term "transparent" means that a human observer can perceive the monument body 11 from a distance of a few centimeters or further through the transparent film 12 without the transparent film influencing the overall optical impression of the monument body 11. This particularly applies in situations in which the light-emitting elements 13 do not emit any light. In situations in which the light-emitting elements 13 can emit light, the overall optical impression for an observer can certainly be influenced, for instance, in that, as a result of the overall view of the light which is emitted by all the light-emitting elements 13 for the observer, a pictorial representation is produced. In this case, another "transparency" of the film 12 may also generally be present, from a technical point of view, in the sense that a substantial portion of light, which strikes the film 12 from one side, can reach the other side through the film. However, it may be the case that the attention of an observer is drawn by the emitted light to itself in such a manner that areas behind the transparent film 12 are no longer consciously perceived. In all these cases, the film 12 would nevertheless be "transparent" in the sense of the present application.

FIG. 1 shows the transparent film 12 as being applied to a surface of the monument body 11. However, the transparent film 12 can also be integrated in the monument body 11, particularly if the monument body 11 comprises a plurality of components. Thus, for example, an external shell of a monument body 11 may comprise a plurality of plastics layers which are laminated one on the other. In such a case, the transparent film 12 can be embedded between two of these layers if the layers are formed in a transparent manner between the film and the surface. Alternatively or additionally, the cabin monument 10 can also have a transparent protective coating.

FIG. 1 shows a total of twelve light-emitting elements 13 which are arranged in a regular grid over the surface of the transparent film 12. In a real configuration of a cabin monument 10, any number of light-emitting elements 13 may be provided, particularly enough so that, if each light-emitting element 13 acts as a pixel, an image which is sufficiently well resolved can be displayed.

FIG. 1 shows the light-emitting elements 13 in a relatively large state for the sake of clarity in comparison with the extent of the monument body 11 and the transparent film 12. In a real configuration of the cabin monument 10, however, the light-emitting elements 13 may be of any size, in particular of such a size that they are no longer visible to the human eye from a distance of a few centimeters.

Figure 2:
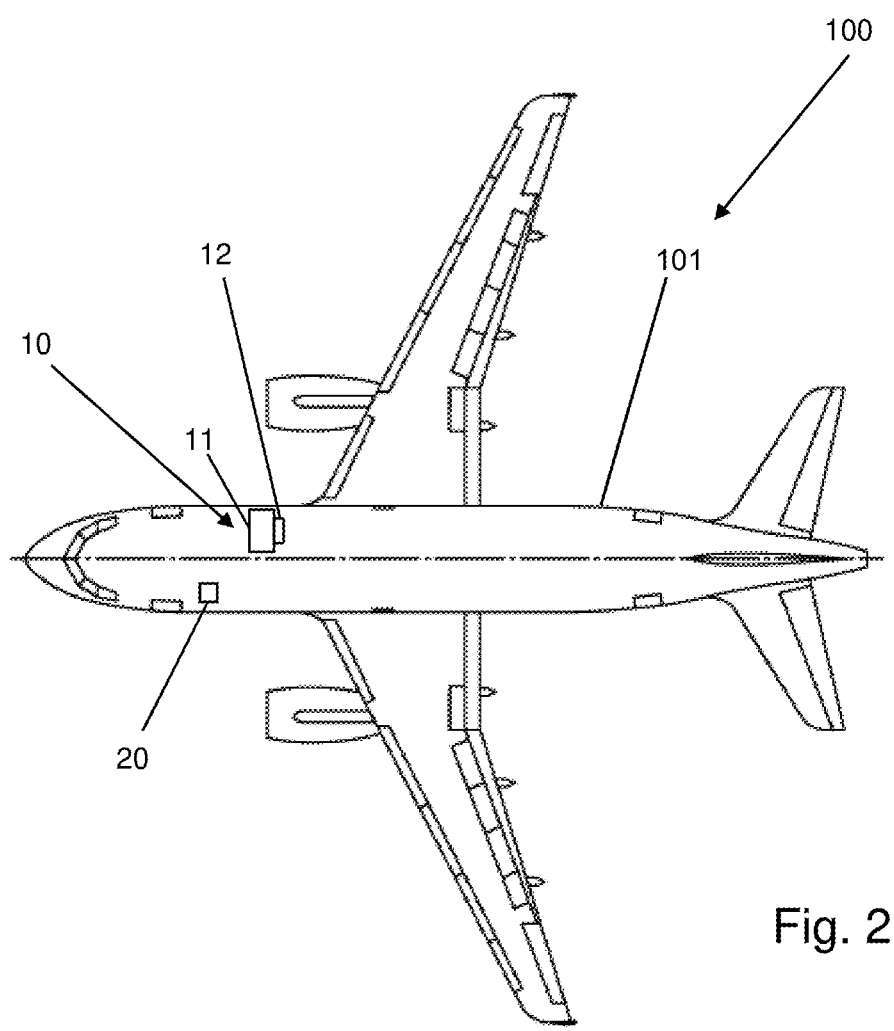
FIG. 2 shows a schematic illustration of an aircraft according to one exemplary embodiment of the invention.

FIG. 2 shows a schematic illustration of an aircraft 100 according to an exemplary embodiment of the invention.

The aircraft 100 has a cabin monument 10 and a control device 20. The cabin monument 10 has a monument body 11 and a transparent film 12. The transparent film 12 has a large number of light-emitting elements, such as more than 10, or more than 100, or more than 1000, which are not shown in FIG. 2 for reasons of clarity.

The features of the aircraft 100 are explained in greater detail below with reference to FIG. 3.

Figure 3:
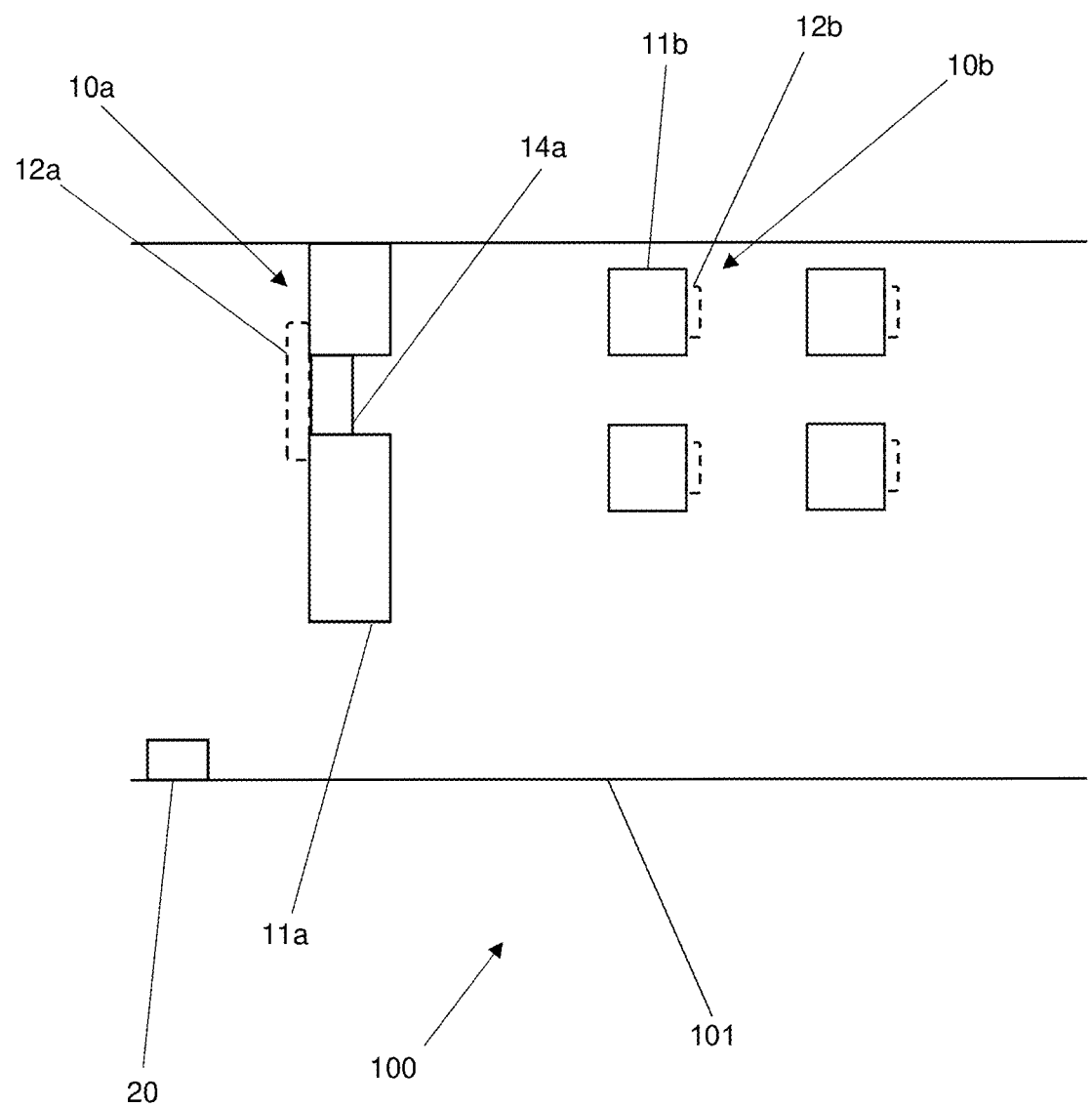
FIG. 3 shows a schematic illustration of a portion of an aircraft according to one exemplary embodiment of the present invention.

FIG. 3 shows a schematic illustration of a portion of an aircraft 100 which includes a fuselage 101 according to an exemplary embodiment of the present invention.

The aircraft 100 has a first cabin monument 10a, a large number of second cabin monuments 10b and a control device 20. The first cabin monument 10a and the second cabin monument 10b each have a monument body 11a, 11b and a transparent film 12a, 12b. For reasons of clarity, in FIG. 3 the illustration of light-emitting elements of the transparent films 12a, 12b is dispensed with. The first cabin monument 10a further has a continuously transparent region 14a, wherein the transparent film 12a of the first cabin monument 10a partially overlaps the transparent region 14a. The control device 20 is connected to the cabin monuments 10a, 10b and is constructed to control the light-emitting elements thereof, wherein this connection is not explicitly shown for reasons of clarity.

The first cabin monument 10a is in the form of a cabin partition wall which subdivides the aircraft 100 into two regions. In this instance, the second cabin monuments 10b are in the form of seat subassemblies and are arranged only in one of the two regions of the aircraft. A region in which passengers remain during the flight in the seat subassemblies and a region which is reserved for the cabin crew is thereby produced.

The transparent film 12a of the first cabin monument 10a is arranged at the side, which is directed toward the region provided for the cabin crew, of the cabin partition wall. The light-emitting elements of the first cabin monument 10a can be constructed in this instance in such a manner that the light emitted by them is radiated through the transparent region 14a of the first cabin monument 10a into the region, provided for the passengers, of the aircraft. A type of unilateral transparency, in which the cabin crew can see through the transparent region 14a into the passenger region, but the passengers cannot see into the crew region, is thereby produced. This may allow the cabin crew to monitor the passenger region, for instance, during a take-off or landing operation, without themselves being observed by the passengers. In particular, it also allows a passenger in a first class suite to maintain his/her private sphere—if feasible as a result of a corresponding cabin layout and with regard to the applicable safety provisions—from other passengers. Alternatively, the light-emitting elements of the first cabin monument 10a can also be arranged in such a manner that they radiate light into the crew area. In this case, the emission of light in situations in which the cabin crew members are intended to monitor the passenger area can be switched off and the light-emitting elements can be used in other situations to show the cabin crew members information which is useful to them. A combination of these two variants is also conceivable both with a transparent film which has light-emitting elements which can emit light in both directions or with two transparent films which are arranged one above the other or beside each other.

The transparent films 12b of the second cabin monuments 10b are fitted to the rear sides of the monument bodies 11b and can thus act as screens for the passengers on the seat groups which are arranged backward. Depending on the situation, the light-emitting elements of the second cabin monuments 10b can emit light or not. Thus, for example, the light-emitting elements could display safety-relevant information items during a take-off or landing operation and, during the flight, could emit no light without the passengers perceiving during the flight a screen, which is switched off and perceived to be disruptive, in their field of vision. Alternatively or additionally, the light-emitting elements can be switched off during a take-off or landing operation in order not to distract the attention of the passengers from directions of the cabin crew, and then to act as a screen during the flight, for example, for playing back entertainment media.

In this instance, the control device 20 is constructed to control the light-emitting elements of the cabin monuments 10a, 10b. This control can be carried out for each cabin monument 10a, 10b, in a manner independent of each other or dependent on each other. If the light-emitting elements of the second cabin monuments 10b are intended to be used, for example, for playing back entertainment media, each of the second cabin monuments 10b can be controlled independently of each other. In other situations, it may be advantageous to control the light-emitting elements of the second cabin monuments 10b in a manner dependent on each other in order to generate an overall optical impression of the cabin which is as harmonious as possible.

The systems and devices described herein may include a controller, control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Cabin monument
10a First cabin monument
10b Second cabin monument
11 Monument body 11a Monument body
11b Monument body
12 Transparent film
12a Transparent film
12b Transparent film
13 Light-emitting element
14a Continuously transparent region
20 Control device
100 Aircraft

The invention claimed is:

1. A cabin monument comprising:
 a monument body which has a continuously transparent region and which is disposed inside of a fuselage of an aircraft; and
 a transparent film which is connected to the monument body, and which at least partially overlaps the transparent region of the monument body;
 wherein the transparent film comprises a large number of light-emitting elements.

2. The cabin monument as claimed in claim 1, wherein light-emitting elements are in the form of light-emitting diodes.

3. The cabin monument as claimed in claim 1, wherein the transparent film is applied to a surface of the monument body.

4. The cabin monument as claimed in claim 1, further having a transparent protective coating.

5. The cabin monument as claimed in claim 1, wherein the light-emitting elements are arranged in such a manner that light is emitted through the transparent region.

6. The cabin monument as claimed in claim 1, wherein the cabin monument comprises a seat component or a cabin partition wall.

7. An aircraft comprising:
 at least one cabin monument as claimed in claim 1; and
 a control device which is configured to control the large number of light-emitting elements of the at least one cabin monument.

8. The aircraft as claimed in claim 7, wherein the control device is configured to control the light-emitting elements of the at least one cabin monument in accordance with an operating state of the aircraft.

9. The aircraft as claimed in claim 8, wherein the operating state of the aircraft includes a take-off operation or a landing operation during which the light-emitting elements are controlled in such a manner that light is emitted.

10. The aircraft as claimed in claim 7, having at least two cabin monuments, wherein the control device is constructed to control the light-emitting elements of the at least two cabin monuments in accordance with each other.

* * * * *